United States Patent
Li

(10) Patent No.: US 7,929,520 B2
(45) Date of Patent: Apr. 19, 2011

(54) METHOD, SYSTEM AND APPARATUS FOR PROVIDING SIGNAL BASED PACKET LOSS CONCEALMENT FOR MEMORYLESS CODECS

(75) Inventor: Dunling Li, Rockville, MD (US)

(73) Assignee: Texas Instruments Incorporated, Dallas, TX (US)

( * ) Notice: Subject to any disclaimer, the term of this patent is extended or adjusted under 35 U.S.C. 154(b) by 334 days.

(21) Appl. No.: 12/113,964

(22) Filed: May 2, 2008

(65) Prior Publication Data

US 2009/0059806 A1    Mar. 5, 2009

Related U.S. Application Data

(60) Provisional application No. 60/968,096, filed on Aug. 27, 2007.

(51) Int. Cl.
*H04L 12/66* (2006.01)
(52) U.S. Cl. ........ 370/352; 370/516; 704/213; 704/215; 704/248; 455/63.1; 455/67.13
(58) Field of Classification Search .......... 370/351–356, 370/516–519; 704/213–215, 220, 258, 263; 455/63.1, 67.13, 422.1, 570, 114.2, 278.1
See application file for complete search history.

(56) References Cited

U.S. PATENT DOCUMENTS

| | | | |
|---|---|---|---|
| 2003/0198195 A1* | 10/2003 | Li .................................. | 370/260 |
| 2004/0204935 A1* | 10/2004 | Anandakumar et al. ...... | 704/230 |
| 2005/0091048 A1 | 4/2005 | Thyssen et al. | |
| 2006/0106598 A1 | 5/2006 | Trombetta et al. | |
| 2006/0182086 A1 | 8/2006 | Dowdal et al. | |
| 2007/0121586 A1 | 5/2007 | Lee et al. | |

OTHER PUBLICATIONS

Sollaud, RFC 4749—RTP Payload Format for the G.729.1 Audio Codec, Oct. 2006, IETF.*

* cited by examiner

*Primary Examiner* — Aung S Moe
*Assistant Examiner* — Hoon J Chung
(74) *Attorney, Agent, or Firm* — Steven A. Shaw; W. James Brady; Frederick J. Telecky, Jr.

(57) ABSTRACT

In a method, apparatus and system for transmitting packet loss concealment (PLC) information, a subscriber device divides a voice sample into a plurality of packets, each including a plurality of successive frames having portions of the voice sample. The subscriber device determines if a predetermined look ahead time duration from the final frame of the plurality of successive frames in a current packet of the plurality of packets includes a noise to voice transition. When the predetermined look ahead time duration is determined to include the noise to voice transition, the subscriber device packs packing information regarding the predetermined look ahead time duration into the current packet. Finally, the subscriber device encodes the plurality of successive frames into the current packet for transmission.

12 Claims, 4 Drawing Sheets

METHOD, SYSTEM AND APPARATUS FOR PROVIDING SIGNAL BASED PACKET LOSS CONCEALMENT FOR MEMORYLESS CODECS

CROSS-REFERENCE TO RELATED APPLICATION

The present application claims the benefit of provisional application No. 60/968,096 filed on 27 Aug. 2007.

TECHNICAL HELD

The technical field relates generally to apparatus and methods for communication over a communication network and, particularly, to encoding and decoding data for communication.

BACKGROUND

Referring to FIG. 1, an exemplary network environment is illustrated in which users can communicate data across distinct networks. In this example, the networks include packet networks, particularly first and second Voice over Internet Protocol (VoIP) networks 102, 104, a cellular communication network 106, and the publicly switched telephone network (PSTN) 108.

A subscriber device such as a personal digital assistant (PDA), a cellular phone, a VoIP phone, a smart phone, a plain old telephone service (POTS) phone, a laptop computer, etc. can access communication services from its respective network. For example, VoIP phones 110, 111, 130, 131 at the first and second Voice over Internet Protocol (VoIP) networks 102, 104 receive communication resources from their respective VoIP network by establishing a connection with a respective access point 112, 132. A POTS phone 114 can receive communication resources from the PSTN 108 by establishing a connection with a class 5 switch 116. A cellular phone 118 can receive communication resources from the cellular communication network 106 by establishing a connection with a base station 120. The cellular phone 118, POTS phone 114, and VoIP phones 110, 111, 130, 131 will all be referred to here as subscriber devices.

In one exemplary communication session between the subscriber device 131 at the first VoIP network 102 and the subscriber device 111 at the second VoIP network 104, the first subscriber device 131 encodes data such as voice, video or audio into packets according to a standard such as G.729, MPEG 4, or G.711 using a codec (coder-decoder) and transmits the encoded data to the second VoIP network 104. The second subscriber device 111 receives and decodes the packets into data by using a codec implementing a compatible standard. Here, the terminology encoding and decoding data will be considered similar to compressing and decompressing data.

Packet loss can occur while the packets are being transmitted over the packet networks due to factors such as signal degradation over the network medium, oversaturated network links, corrupted packets rejected in-transit, faulty networking hardware, maligned system drivers or network applications, or normal routing routines. Further, the service area defined by an access point of the VoIP network can be limited by poor radio link quality conditions, such as, for example, interference due to microwave ovens or radio technologies in the unlicensed 2.4 GHz band. Packet loss can result in significant degradation in the quality of a communication session.

Packet loss does not only occur during communication sessions in which the transmitting and receiving subscriber devices are both at distinct VoIP networks. For example, when a transmitting subscriber device transmits packets over a packet network to a receiving subscriber device at the cellular network or the PSTN, the packets will be decoded according to the compatible standard and re-encoded according to Pulse Code Modulation (PCM) at a media gateway, and transmitted over the PSTN. Here, any packet loss will also affect the quality of the PCM re-encoded data.

Packet loss concealment (PLC) can be performed to mask the effects of packet loss. However, PLC at the receiving subscribing device is not sufficient for recovering all of the packet loss. Other approaches such as transmitting extra information can improve the quality of speech reconstructed at the receiving end, but also have the drawback of higher bandwidth consumption.

SUMMARY

Accordingly, one or more embodiments of the present invention provide a subscriber device capable of transmitting Packet Loss Concealment (PLC) information during signal transmission and capable of detecting PLC information during signal reception of packets. The subscriber device includes, generally, an interface, a processor and memory. The interface receives and transmits packets over a network connection. The interface also receives input voice from an input unit such as a microphone and transmits output voice to an output unit such as a speaker The memory includes instructions for configuring the processor to: divide the input voice received from the input unit into a plurality of packet time durations, each including a plurality of successive frames, each of the plurality of successive frames including a portion of the input voice; determine if a predetermined look ahead time duration from the final frame of one of the plurality of packet time durations includes a noise to voice transition; when the predetermined look ahead time duration is determined to include the noise to voice transition, packing information regarding the predetermined look ahead time duration into the one packet time duration; and encode the one packet time duration into a packet for transmission.

The processor can further be configured to unpack a first of received packets and determine if the first received packet includes packet loss and an indication that a subsequent received packet will include a noise to voice transition. The processor can store parameters of the first received packet in the memory and decode the first received packet according to regular encoding if it does not include packet loss and includes the indication that the subsequent received packet includes the noise to voice transition to generate the output voice. The processor decodes the first received packet according to regular PLC if it does include packet loss to generate the output voice. The processor unpacks the subsequent received packet and determines if the subsequent received packet includes packet loss. The processor generates voice from the subsequent received packet based upon the stored parameters of the first received packet if it was determined to include the indication and the subsequent packet is determined to include packet loss.

One or more embodiments of the present invention also provide a method for providing PLC for a subscriber device. The method includes dividing a voice sample into a plurality of packets, each of which including a plurality of successive frames having portions of the voice sample. It is determined if a predetermined look ahead time duration from the final frame of the plurality of successive frames in a current packet includes a noise to voice transition.

When the predetermined look ahead time duration is determined to include the noise to voice transition, information regarding the predetermined look ahead time duration is packed into the current packet. For example, information regarding a pitch and power in the predetermined look ahead time duration can be stored in the current packet.

Determining of the noise to voice transition can include: calculating the zero-crossing rate (ZCR) for each sub-frame of the final frame; calculating the average ZCR (ZCR_avg) for all of the successive frames in the current packet; calculating the ZCR of the first sub-frame (ZCR_new) of a subsequent packet to the current packet, wherein the predetermined look ahead time duration is the first sub-frame; and determining that the predetermined look ahead time duration does not include a noise to voice transition if ZCR_new is less than or equal to 1.2*ZCR, and ZCR_new is less than a certain threshold.

If ZCR_new is greater than 1.2*ZCR or ZCR_new is greater than or equal to the first threshold, an average power (P_avg) for the current packet and an average power for the first sub-frame of the subsequent packet (P_new) is determined. The predetermined look ahead time duration can be determined to not include a noise to voice transition if P_new/P_avg is greater than or equal to 2.5.

When the predetermined look ahead time duration is determined to include the noise to voice transition, a packing flag of the current packet can be set to indicate that the noise to voice transition was determined, and pitch or power ratio can be packed into the current packet.

According to the method, a packet received from another subscriber device is unpacked, and it is determined if packet loss is not present in the received packet. If packet loss is present in the received packet, it is determined if the received packet includes an indication that the received packet includes a noise to voice transition. If the received packet includes the indication, synthesis speech can be generated based upon parameters of a previously received packet. If the received packet is determined not to include the indication, a current frame can be generated based upon a previous waveform.

According to the novel method and the novel subscriber device, additional PLC information is transmitted during a noise to voice transition to thereby prevent front-end of voice clipping. This approach has the advantage of conserving bandwidth because extra PLC information is not required to be continuously transmitted.

BRIEF DESCRIPTION OF THE DRAWINGS

The accompanying figures, where like reference numerals refer to identical or functionally similar elements and which together with the detailed description below are incorporated in and form part of the specification, serve to further illustrate various exemplary embodiments and to explain various principles and advantages in accordance with the present invention.

DETAILED DESCRIPTION

Figure 1:
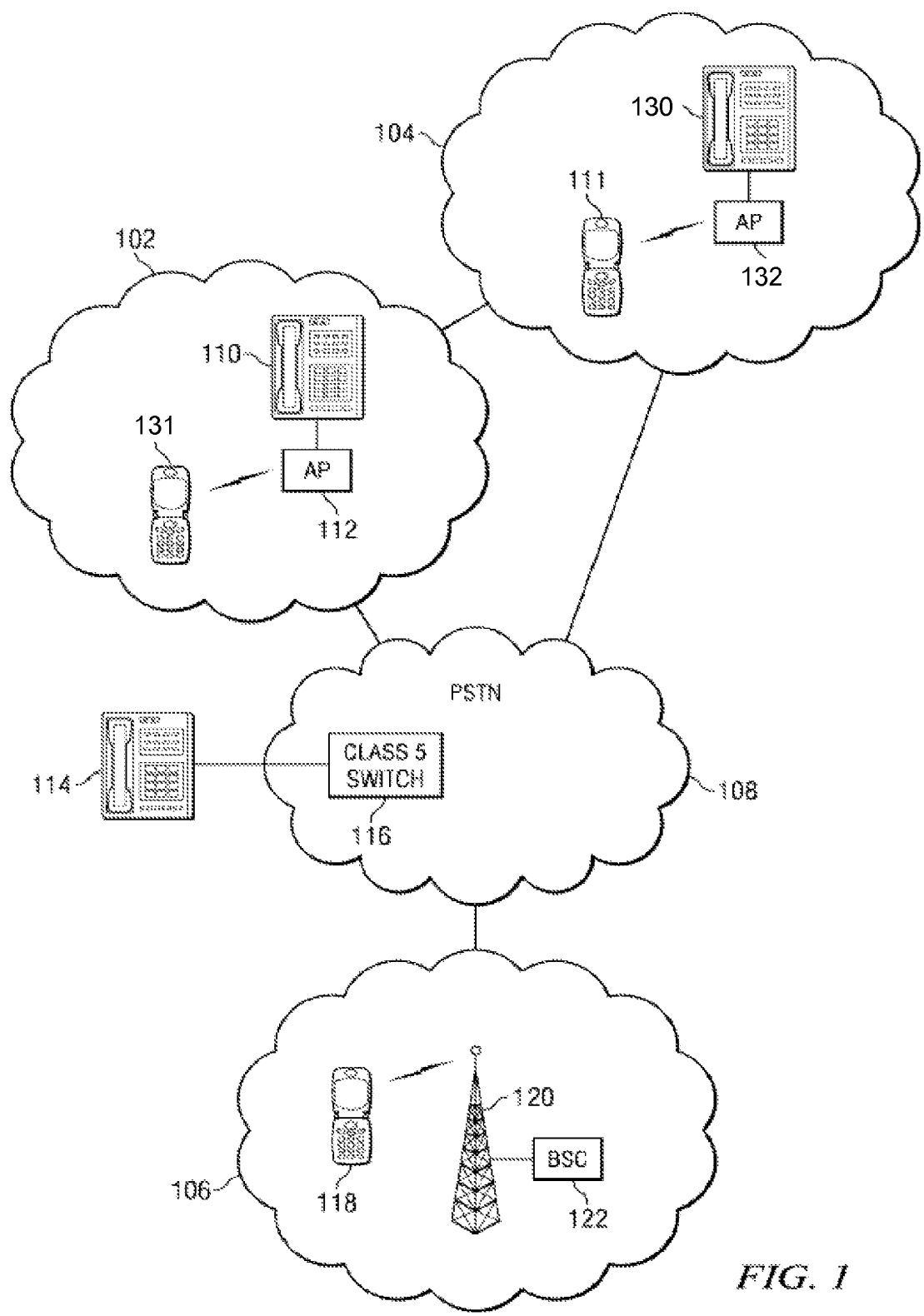
FIG. 1 is a diagram illustrating a simplified and representative environment in which a method, system or apparatus for performing packet loss concealment can be implemented.

In overview, the present disclosure concerns subscriber devices performing communication via a packet network such as a Voice over Internet Protocol (VoIP) network. The subscriber device may be any device capable of performing voice and/or data communication. More particularly, various inventive concepts and principles are embodied in systems, apparatus, and methods therein for providing the subscriber device with a codec for encoding voice signal/data into packets, such as Real-time Protocol (RTP) packets and including additional packet loss concealment (PLC) information to be transmitted during a noise to voice transition to thereby prevent front-end of voice clipping.

The instant disclosure is provided to further explain in an enabling fashion the best modes of performing one or more embodiments of the present invention. The disclosure is further offered to enhance an understanding and appreciation for the inventive principles and advantages thereof rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, are best supported with or in software or integrated circuits (ICs), such as a digital signal processor and software therefore, and/or application specific ICs, or a combination thereof. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring the principles and concepts according to the present invention, further discussion of such software and ICs, if any, will be limited to the essentials with respect to the principles and concepts used by the exemplary embodiments.

As mentioned in the background, PLC can be performed to mask the effects of packet loss. For example, when PLC is conducted at the receiving subscribing device, a PLC algorithm attempts to seamlessly repeat the past signal and generate a synthesized signal when a packet loss occurs. This approach performs adequately if the lost packet is part of speech or noise periods. However, when the lost packet is at the beginning of transition from noise to voice or voice to noise, this approach can not recover the loss. Moreover, at the noise to voice transition, the synthesized speech would lead to front-end voice clipping.

Since the distortion during noise periods is not critical for speech communication and the end of voice is usually at a low level, the repetition of voice at the beginning of a noise period will not degrade overall speech quality. Therefore, voice information needs to be transmitted during noise to voice transitions to avoid the front-end voice loss.

Referring to the flow diagram of FIG. 2, exemplary operations of the subscriber device when encoding a voice signal into a packet for transmission will be discussed. At 201, a subscriber device receives speech or voice samples from a microphone. For example, referring to FIG. 5, a user can input the voice samples to a microphone 502 coupled to an interface 510, which transmits the voice samples to a processor 520 for performing various processing according to instructions stored in a memory 530.

Returning to FIG. 2, at 205 an initialization process is performed to divide the voice samples into packet time durations, each including successive frames of voice streams according to the particular compression or encoding format used and predetermined parameters. In this example, a packet time duration, or packet size (Psize) is 160 ms, a frame size (Fsize) is 40 ms, and the number of frames for each packet is 4. Also, the current frame (iframe) is set to the first frame, the pitch is set to 0, and alpha is set to 1. The pitch represents the fundamental frequency of a speech signal and can be calculated by well defined pitch search algorithms in speech coding such as an autocorrelation method. The parameter alpha is defined as the power ratio of a look-ahead-frame and the current frame.

At 210, the subscriber device determines if the current frame (iframe) is the last frame (nframe). If the iframe is not the nframe (NO at 210), then at 215 the subscribe device encodes the current frame according to a predetermined encoding format such as, for example, G.711 and packs it into the current packet. At 220, the subscriber device inputs the next frame and returns to 210.

If the iframe is the nframe (YES at 210), at 225 the subscribe device determines if a noise to voice transition is present in a look ahead sample. The time duration of the look ahead sample can be, for example, 10 ms. An exemplary approach for determining noise to voice transitions will be discussed later with respect to FIG. 3.

If the subscriber device determines that a noise to voice transition is present in the look ahead sample (YES at 225), at 230 the subscriber device finds the pitch (T) and power (Pv) of the look ahead sample, sets a packing flag (vflag) of the current frame equal to 1 and sets the pitch T and alpha of the current packet equal to Pv/Pc, wherein Pc is the power of the current frame. The packing flag (vflag) is a variable indicating of a noise to voice transition. Then, at 240 the subscriber device encodes the current frame and packs it into a current packet according to the predetermined encoding format.

If the subscriber device determines that a noise to voice transition is not present in the look ahead sample (NO at 225), at 235 the subscriber device sets the packing flag (vflag) equal to zero. Then, at 240, the subscriber device encodes the current frame and packs it into the current packet. That is, if a noise to voice transition is detected in the last frame of the current packet, the subscribe device extracts voice information from a frame subsequent to the frame in which the transition is detected, and packs the voice information into the current packet.

At 245, the subscribe device sends the current packet to the packet network and the process ends for the current packet. The packets are preferably formatted according to real-time protocol (RTP).

Figure 2:
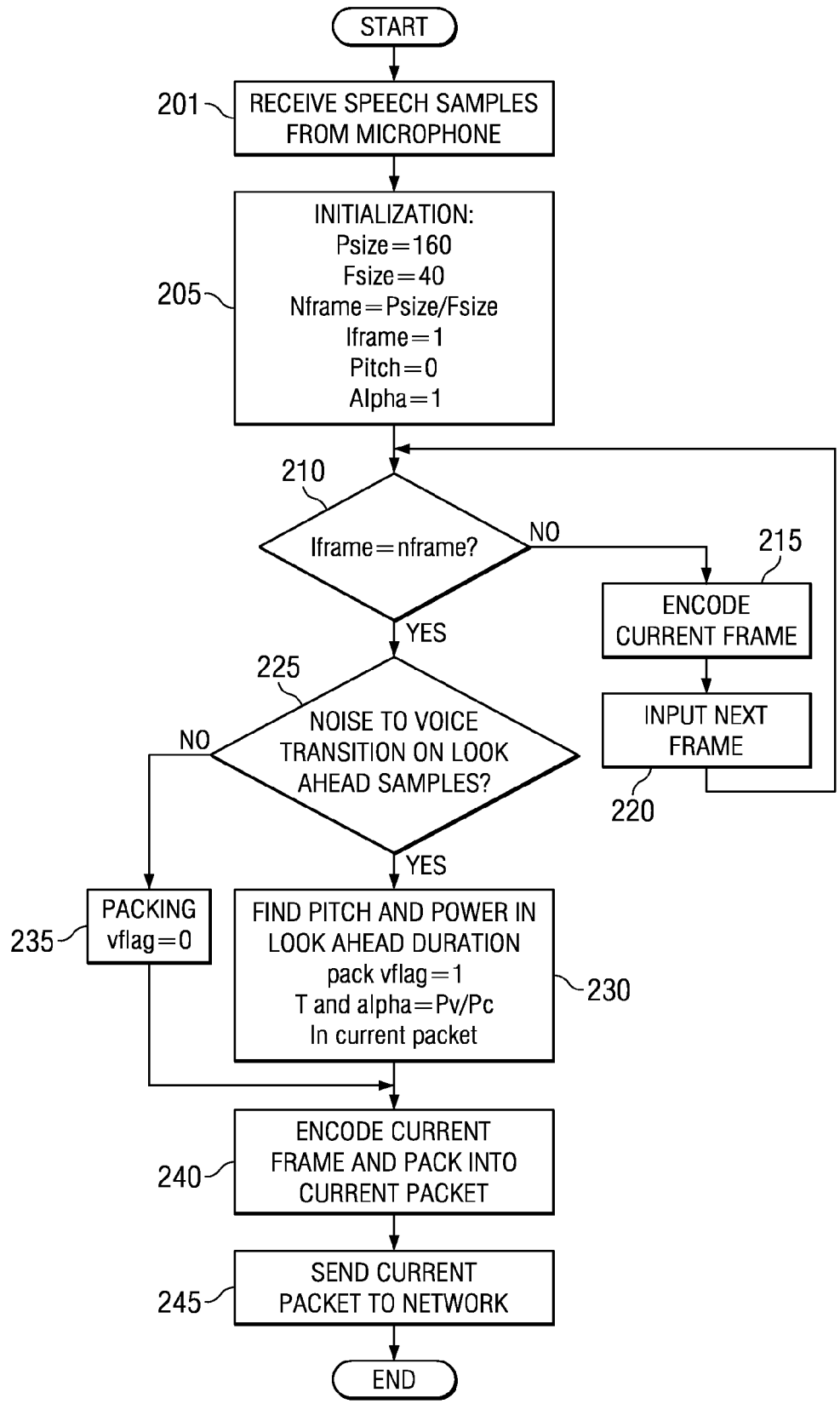
FIG. 2 is a flow diagram illustrating exemplary operations of the subscriber device when encoding a voice signal into a packet for transmission.
Figure 3:
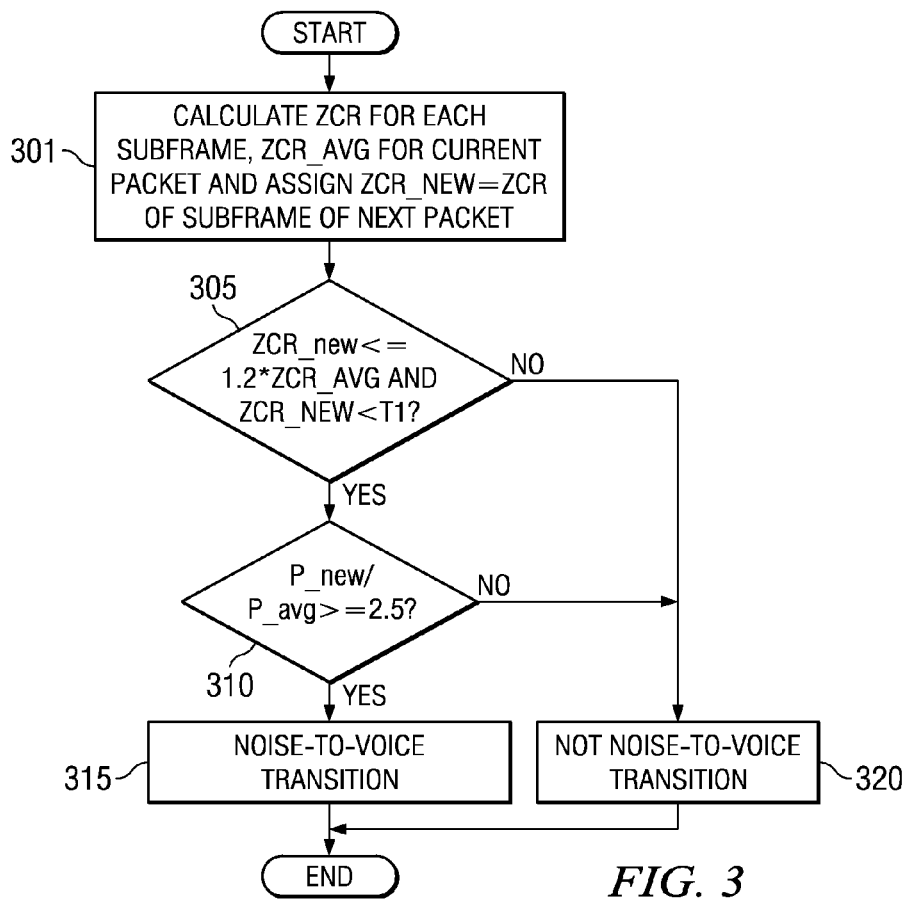
FIG. 3 is a flow diagram illustrating exemplary operations of the subscriber device for determining a noise to voice transition.

Referring to FIG. 3, exemplary operations of the subscriber device for determining a noise to voice transition will be discussed. These operations preferable occur at 225 of the flow diagram shown in FIG. 2. At 301, the subscriber device calculates the zero-crossing rate (ZCR) for each subframe of the current frame. For example, if the subscriber device is using G.711 compression format, each subframe includes 5 ms time duration of voice stream. The subscriber device also calculates the average ZCR for the current packet (ZCR_avg) and the ZCR of the first subframe (ZCR_new) of the next packet subsequent to the current packet. The first subframe can be equivalent to the predetermined look-ahead duration. The ZCR_new can be calculated by adding extra delay using the look-ahead frame.

At 305, the subscriber device determines if ZCR_new (the ZCR of the first subframe of the subsequent packet) is less than or equal to $\lambda$*ZCR_AVG and if ZCR_new is less than a certain threshold (T1), where $\lambda$ and T1 are defined based on the distribution of the ZCR. Usually ZCR is much less in voice frames than noise or non-voice frames. Here, an exemplary value for $\lambda$ is 1.2. An exemplary value for T1 is 0.3.

If the subscriber device determines that either ZCR_new is greater than 2*ZCR_AVG or ZCR_new is greater than or equal to T1 (NO at 305), then at 320 the subscriber device determines that a noise to voice transition is not present.

If the subscriber device determines that ZCR_new is less than or equal to 1.2*ZCR_AVG and ZCR_new is less than T1 (YES at 305), then at 310, the subscriber device calculates an average power (P_avg) for the current packet and an average power (P_new) for the subframe of the subsequent packet.

If the subscriber device determines that the look-ahead-frame power is significantly greater than the average power of the current packet, e.g. P_new/P_avg is greater than or equal to 2.5 (YES at 310), then at 315 a noise to voice transition is determined to be present. If P_new/P_avg is less than 2.5, then at 320 a noise to voice transition is determined to not be present.

Figure 4:
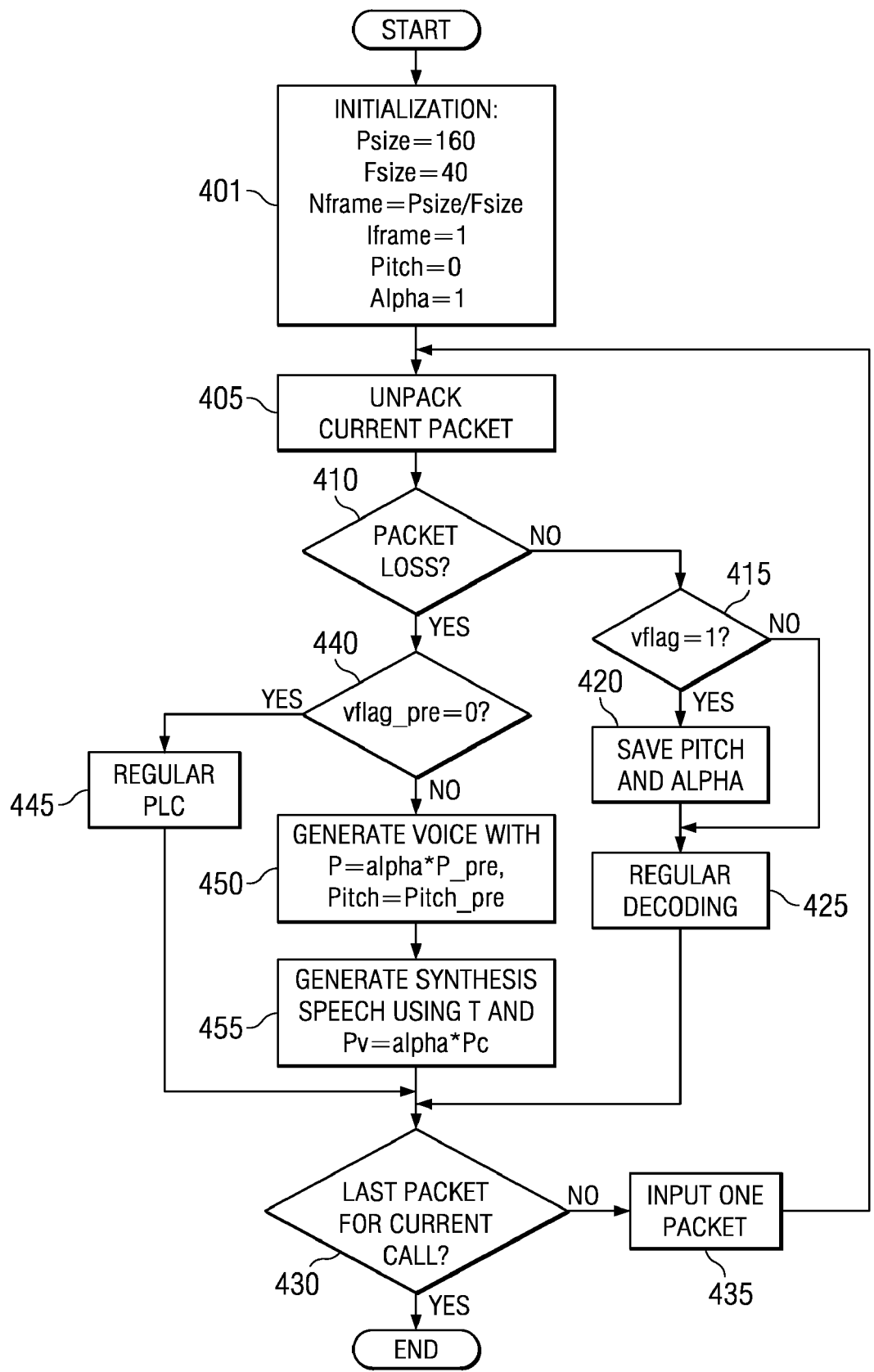
FIG. 4 is a flow diagram illustrating exemplary operations of the subscriber device when decoding a received packet into a voice signal.

Referring to FIG. 4, exemplary operations of the subscriber device when decoding received packets into voice will be discussed. At 401, the subscriber device initializes the frames of a received packet according to predetermined time duration parameters. For example, a packet size (Psize) is 160 ms, a frame size (Fsize) is 40 ms, the number of frames for each packet is 4, the current frame (iframe) is set to the first frame, the pitch is set to 0, and alpha is set to 1.

At 405, the subscriber device unpacks the current packet into frames. At 410, the subscriber device determines if any packet loss is present in the current packet by, for example, conventional techniques such as, for example, late packet arrival.

If the receiving subscriber device determines that no packet loss is in the current packet (NO at 410), at 415 the subscriber device determines if the flag vflag is equal to 1. As discussed with respect to FIG. 2, the transmitting subscriber device sets the vflag to 1 when a noise to voice transition was determined to be present on a look ahead sample and sets the vflag to 0 when no noise to voice transition was determined to be present. If the flag vflag is equal to 1 (YES at 415), at 420 the subscriber device saves the pitch and alpha of the current packet. At 425 the subscriber device performs regular decoding or decompression of the current packet. If the flag vflag is not equal to 1 (NO at 415), then the subscriber device performs regular decoding at 425.

At 430, the subscriber device determines if the current packet is the last packet for the current call. If it is the last packet (YES at 430), the process ends. If it is not the last packet (NO at 430), at 435 the subscriber device inputs another packet. The voice obtained from the decoded packets and/or the synthesis speech can be output by a speaker 505 coupled to the interface 510 as shown in FIG. 5.

If the subscriber device determines that there is packet loss in the current packet (YES at 410), at 440 the subscriber device determines if the flag of the previous packet Vflag_pre is equal to 0. If the flag Vflag_pre is equal to 0 (YES at 440), at 445 the subscriber device performs regular PLC.

If the flag Vflag_pre is not equal to 0 (NO at 440), at 450 the subscriber device generates voice using a pitch equal to the pitch of the previous packet (Pitch_pre) and a power related to the power of the previous packet (P_pre) multiplied by alpha. At 455, the subscriber device generates synthesis speech using the pitch T and a voice frame power (Pv) that is equal to alpha multiplied by the power of the current frame (Pc). Then, at 430, the subscriber device determines if the current packet is the last packet for the current call. If it is the last packet (YES at 430), the process ends. If it is not the last packet (NO at 430), at 435 the subscriber device inputs another packet.

Figure 5:
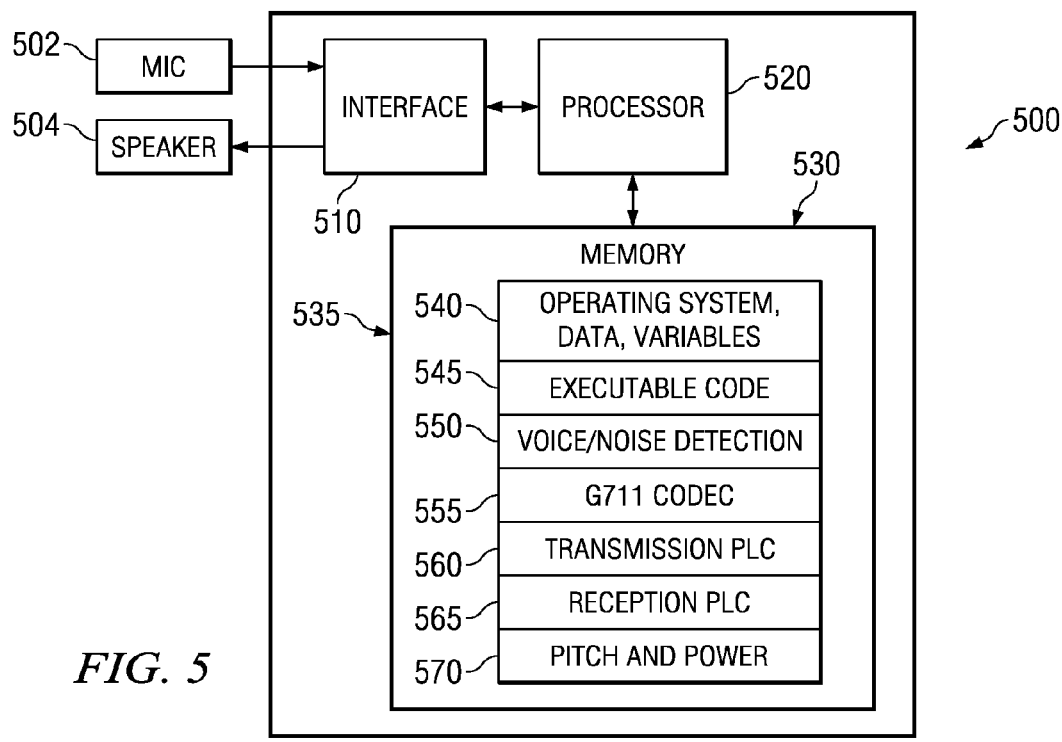
FIG. 5 is a block diagram showing exemplary portions of the subscriber device.

Referring to FIG. 5, a block diagram of exemplary portions of an exemplary subscriber device 500 for signal based PLC will be will be discussed. The subscriber device 500 generally includes the microphone 502 and speaker 504 coupled to the interface 510, a processor 520 coupled to the interface 510, and a memory 530.

The interface 510 receives data such as voice samples from a user input device such as the microphone 502 and outputs voice samples to the user via an output device such as the speaker 504. The interface 510 is farther for receiving reception signals from and transmitting transmission signals to, for example, a base station of a cellular network, an access point of a VoIP network, or a class 5 switch of the PSTN. The reception signals and transmission signals preferably include RTP packets.

The memory 530 can be one or a combination of a variety of types of memory or computer readable medium such as random access memory (RAM), read only memory (ROM), flash memory, dynamic RAM (DRAM) or the like. The memory 530 can include a basic operating system, data, and variables 540, and executable code 545.

Further, the memory 530 can include computer programs or instructions for configuring the processor 520 such as Noise to Voice/Voice to Noise transmission detection instructions 550, G.711 codec instructions 555, transmission PLC instructions 560, reception PLC instructions 565 and pitch and power instructions 570, each of which will be discussed more fully below.

The Noise to Voice/Voice to Noise transmission detection instructions 550 are for configuring the processor 520 to calculate the zero-crossing rate (ZCR) of particular sub-frames and the power of packets in order to determine if a predetermined look ahead duration includes a noise to voice transition as discussed with respect to the flow diagram of FIG. 3.

The G.711 codec instructions 555 are for configuring the processor 520 to encode voice into RTP packets and to decode RTP packets into voice. Other encoding/decoding codecs such as G.729 and MPEG 4 can also be included.

The transmission PLC instructions 560 are for configuring the processor 520 to divide voice samples into a plurality of packets, each including a plurality of successive frames having portions of the voice sample and to pack information regarding the predetermined look ahead time duration into the current packet when the predetermined look ahead time duration is determined to include the noise to voice transition as discussed with respect to the flow diagram of FIG. 2.

The reception PLC instructions 565 are for configuring the processor 520 to unpack the packets and determine if each of the packets includes packet loss, and to generate voice based upon regular decoding or upon the parameters of a different packet depending upon whether the previous packet included an indication of a noise to voice transition and the presence of packet loss as discussed with respect to the flow diagram of FIG. 4.

The pitch and power instructions 570 are for configuring the processor 520 to store parameters such as the pitch and alpha of particular packets in the memory 530 depending upon the presence of packet loss and a determination that a subsequent packet includes a noise to voice transition.

This disclosure is intended to explain how to fashion and use various embodiments in accordance with the invention rather than to limit the true, intended, and fair scope and spirit thereof. The invention is defined solely by the appended claims, as they may be amended during the pendency of this application for patent, and all equivalents thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

The invention claimed is:

1. A method for providing packet loss concealment (PLC) for a subscriber device, the method comprising:
   dividing, in the subscriber device, a voice sample into a plurality of packets, each packet of the plurality of packets including a plurality of successive frames having portions of the voice sample;
   determining, in the subscriber device, if a predetermined look ahead time duration from a final frame of the plurality of successive frames in a current packet of the plurality of packets includes a noise to voice transition;
   when the predetermined look ahead time duration is determined to include the noise to voice transition, the subscriber device packing information regarding the predetermined look ahead time duration into the current packet;
   when the predetermined look ahead time duration is determined to not include the noise to voice transition, the subscriber device not packing said information regarding the predetermined look ahead time duration into the current packet; and
   encoding the plurality of successive frames into the current packet for transmission from the subscriber device,
   the information regarding the predetermined look ahead time duration including voice information extracted from one frame of a plurality of frames subsequent to the final frame in which the noise to voice transition is detected.

2. The method of claim 1, wherein the determining of the noise to voice transition further includes:
   calculating a zero-crossing rate (ZCR) for each sub-frame of the final frame;
   calculating an average ZCR (ZCR_avg) for all of the successive frames in the current packet;
   calculating a ZCR of a first sub-frame (ZCR_new) of a subsequent packet to the current packet, wherein the predetermined look ahead time duration is the first sub-frame of the subsequent packet to the current packet; and determining that the predetermined look ahead time duration does not include the noise to voice transition if the ZCR_new of the subsequent packet to the current packet is not less than or equal to λ*ZCR for each sub-frame of the final frame or the ZCR_new of the subsequent packet to the current packet is not less than a certain threshold (T1), wherein λ and T1 are parameters defined based on a distribution of the ZCR for each sub-frame of the final frame.

3. The method of claim 2, wherein the determining of the noise to voice transition further includes:

if the ZCR_new of the subsequent packet to the current packet is not greater than λ*ZCR or the ZCR_new of the subsequent packet to the current packet is not greater than or equal to the certain threshold, determining an average power (P_avg) for the current packet and an average power for the first sub-frame of the subsequent packet (P_new); and determining that the predetermined look ahead time duration does include the noise to voice transition if P_new/P_avg for the current packet is greater than or equal to 2.5.

4. The method of claim 1, wherein the packing the information regarding the predetermined look ahead time duration into the current packet further includes storing information regarding a pitch and power of the predetermined look ahead time duration in the current packet.

5. The method of claim 1, wherein the encoding the plurality of successive frames into the current packet for transmission further includes performing the encoding according to G.711 encoding format and real-time protocol (RTP).

6. The method of claim 1, wherein when the predetermined look ahead time duration is determined to include the noise to voice transition, setting a packing flag of the current packet to indicate that the noise to voice transition was determined.

7. The method of claim 6, wherein when the predetermined look ahead time duration is determined to include the noise to voice transition, packing a pitch or power ratio of the predetermined look ahead time duration into the current packet.

8. The method of claim 1, further comprising:

unpacking, at the subscriber device, a packet received from another subscriber device;

determining, at the subscriber device, if packet loss is not present in the received packet;

if packet loss is present in the received packet, the subscriber device determining if the received packet includes a noise-to-voice-transition indication that the received packet includes a noise to voice transition; and if the received packet includes the noise-to-voice-transition indication, the subscriber device generating synthesis speech based upon parameters of a previously received packet.

9. The method of claim 8, further comprising generating a current frame based upon a previous waveform if the received packet is determined not to include the noise-to-voice-transition indication.

10. A subscriber device for encoding input voice into packets including packet loss concealment (PLC) to be transmitted and decoding received packets including PLC into output voice, comprising:

an interface for receiving and transmitting packets including PLC over a network connection, and for receiving the input voice from an input unit coupled to the interface and transmitting the output voice to an output unit coupled to the interface;

a processor coupled to the interface; and a memory coupled to the processor, the memory including instructions for configuring the processor to:

divide the input voice received from the input unit into a plurality of packet time durations, each of the packet time durations including a plurality of successive frames, each of the plurality of successive frames including a portion of the input voice;

determine if a predetermined look ahead time duration from a final frame of one of the plurality of packet time durations includes a noise to voice transition;

when the predetermined look ahead time duration is determined to include the noise to voice transition, packing information regarding the predetermined look ahead time duration into the one of the plurality of packet time durations;

when the predetermined look ahead time duration is determined to not include the noise to voice transition, not packing said information regarding the predetermined look ahead time duration into the one of the plurality of packet time durations; and encode the one of the plurality of packet time durations into a packet for transmission from the subscriber device, the information regarding the predetermined look ahead time duration including voice information extracted from one frame of a plurality of frames subsequent to the final frame in which the noise to voice transition is detected.

11. The subscriber device of claim 10, wherein the processor is further configured to:

unpack a first of the received packets;

determine if the first received packet includes packet loss;

determine if the first received packet includes an indication that a subsequent received packet includes a noise to voice transition;

store parameters of the first received packet in the memory and decode the first received packet according to regular encoding if the first received packet does not include packet loss and includes the indication that the subsequent received packet includes the noise to voice transition;

decode the first received packet according to regular PLC if the first received packet does include packet loss to generate the output voice;

unpack the subsequent received packet;

determine if the subsequent received packet includes packet loss; and generate voice from the subsequent received packet based upon the stored parameters of the first received packet if the subsequent received packet was determined to include the indication that the subsequent packet includes the noise to voice transition and the subsequent received packet is determined to include packet loss.

12. The subscriber device of claim 10, wherein the interface is capable of Voice over Internet Protocol (VoIP) communication with an access point to an Internet Protocol (IP) based network.

* * * * *